No. 692,448. Patented Feb. 4, 1902.
I. H. JONES.
BAKING PAN.
(Application filed Nov. 9, 1901.)
(No Model.)
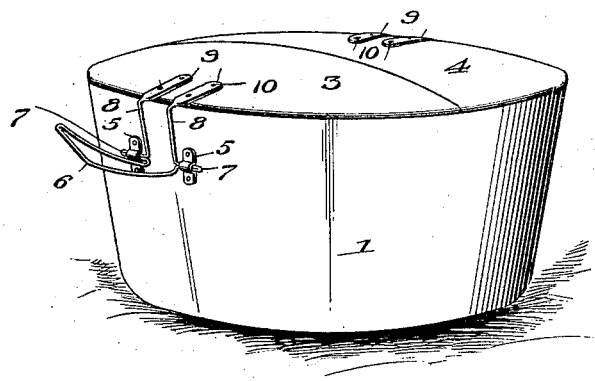
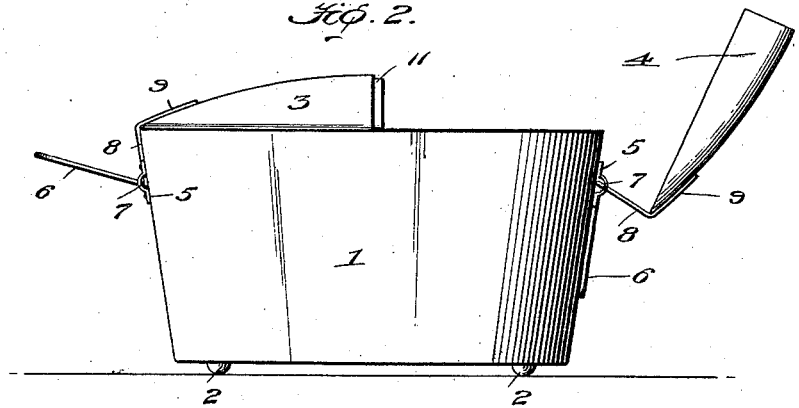
Witnesses
Inventor
Isabella H. Jones
by F. O. M. Cleary
Attorney
THE NORRIS PETERS CO., PHOTO-LITHO., WASHINGTON, D. C.

UNITED STATES PATENT OFFICE.

ISABELLA HUMPHREYS JONES, OF SALISBURY, MARYLAND.

BAKING-PAN.

SPECIFICATION forming part of Letters Patent No. 692,448, dated February 4, 1902.

Application filed November 9, 1901. Serial No. 81,731. (No model.)

*To all whom it may concern:*

Be it known that I, ISABELLA HUMPHREYS JONES, a citizen of the United States, residing at Salisbury, in the county of Wicomico and State of Maryland, have invented certain new and useful Improvements in Baking-Pans; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to baking-pans of the class which are provided with covers; and its object is to provide simple and convenient means for hinging the covers to the pan and for raising and lowering the covers and supporting them in their raised position.

A further object of the invention is to provide a covered pan with attachments which serve the double purpose of handles for lifting the pan and stops or braces for supporting the pan-covers in open or raised position.

A further object is to provide a pan with a cover consisting of two hinged sections, the meeting edges of which overlap each other to prevent the escape of heat.

The construction of the improvement will be fully described hereinafter in connection with the accompanying drawings, which form a part of this specification, and its novel features will be particularly set forth in the appended claims.

In the drawings, Figure 1 is a view in perspective of a baking-pan embodying the invention. Fig. 2 is a side elevation of the same, showing one section of the cover closed and the other in raised or open position; and Fig. 3 is a detail vertical section more clearly illustrating the overlapped meeting edges of the cover-sections.

The reference-numeral 1 designates the pan, provided on its bottom with supporting-feet 2, and 3 and 4 designate the sections of the cover, of semicircular form. Each of the cover-sections is attached to the pan by a combination hinge and handle device comprising parallel ears 5, riveted to the outside of the pan, and a single piece of wire bent to form a loop-handle 6, laterally-projecting pintles 7, and angle-arms 8. As clearly shown in Fig. 1, the ends 9 of the angle-arms 8 are flattened and secured by rivets 10 to the pan-sections.

While I have shown the combination hinge and handle as consisting of a single piece of wire bent to the required shape, I would have it understood that the invention is not restricted to this specific construction, but includes all such forms of the device as include a loop or handle, pintles or pivots, and securing-arms.

The cover-section 3 is formed at its inner edge with a depressed flange, upon which the inner edge of the other section 4 is adapted to rest, thus forming a lap-joint to prevent the escape of heat from the pan.

The utility and operation of the improvement will be readily understood. By depressing the handles 6 the cover-sections are raised, and the contact of said handles with the outer surface of the pan, as shown at the right in Fig. 2, supports them in open position. When the cover-sections are closed, the pan may be readily lifted by the handles 6 without affecting the cover-sections. The feet 2 prevent contact of the bottom of the pan with the heating-surface upon which the pan rests, and thus the burning of the dough or other contents of the pan is avoided.

I claim—

1. The combination with a pan, of a cover comprising independent sections and handles pivotally secured to opposite sides of the pan and having angle-arms secured to said cover-sections, said handles serving as stops or braces to support the cover-sections in their raised or open positions.

2. The combination with a pan, of a cover comprising independent sections, and means for hinging the sections consisting of ears secured to the pan, and a handle having laterally-projecting pintles and angle-arms, said arms being secured to the cover-sections.

3. The combination with a pan, of a cover comprising independent semicircular sections each secured to the pan by a combination hinge and handle device consisting of a single piece of wire bent to form a loop-handle, laterally-projecting pivots, and angle-arms, and ears secured to the pan to serve as bearings for said pivots.

4. The combination with a pan, of cover-sections having a lap-joint, at their meeting edges, and handles pivotally secured to the pan and provided with angle-arms secured to the cover-sections said handles serving as stops or braces to support the cover-sections in raised position.

In testimony whereof I affix my signature in presence of two witnesses.

ISABELLA HUMPHREYS JONES.

Witnesses:
F. M. SLEMONS,
A. D. TOODVINE.